United States Patent
Quagliana

(10) Patent No.: US 6,560,317 B1
(45) Date of Patent: May 6, 2003

(54) RECEIVING CALLER IDENTIFICATION INFORMATION WITH A TELECOMMUNICATIONS DEVICE FOR THE DEAF

(75) Inventor: Douglas D. Quagliana, Edison, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/038,411

(22) Filed: Jan. 3, 2002

(51) Int. Cl.$^7$ .............................................. H04M 11/00

(52) U.S. Cl. ................ 379/52; 379/142.14; 379/142.01

(58) Field of Search ................................ 379/52, 93.08, 379/93.17, 93.18, 93.23, 93.27, 142.01, 142.04, 142.06, 142.09, 142.1, 142.14, 142.17, 88.19, 88.21

(56) References Cited

U.S. PATENT DOCUMENTS 5,915,000 A * 6/1999 Nguyen et al. ................ 379/52
6,341,161 B1 * 1/2002 Latter et al. ............ 379/142.01

* cited by examiner

Primary Examiner—Wing Fu Chan
(74) Attorney, Agent, or Firm—Blakely, Sokoloff, Taylor & Zafman LLP

(57) ABSTRACT

A central office (CO) for a telephone connected with a telecommunication device for the deaf (TDD) called by a calling device determines that the called TDD is connected with the called CO. The called CO postpones indication that the called TDD has connected with the called CO, until the called CO determines whether the called TDD is willing to connect with the calling device. This causes the calling device to continue to receive an indication that a connection has yet to be established between the calling device and the called TDD. As a result of being connected with the telephone connected with the TDD, the called CO transmits caller identification (CID) information regarding the calling device in a format that can be received by a TDD.

29 Claims, 3 Drawing Sheets

RECEIVING CALLER IDENTIFICATION INFORMATION WITH A TELECOMMUNICATIONS DEVICE FOR THE DEAF

FIELD OF THE INVENTION

The present invention relates to receiving caller identification (CID) information with a telecommunications device for the deaf (TDD).

BACKGROUND OF THE INVENTION

Wired telephones are connected to a telephone company's central office (CO) through a two-wire circuit called a local loop. A CO contains switching equipment that connects the telephone lines of a calling telephone terminating at one CO to the telephone lines of a called telephone terminating at another CO. When the switches between a telephone and a CO are open (e.g., because a telephone handset is holding down a switchhook), there is no connection between the telephone and the CO. However, once the switches between a telephone and a CO are closed (e.g., because the telephone handset is removed, causing the switchhook to lift up), the local loop is complete, thus establishing a connection between the telephone and the CO.

When a calling telephone is connected with the calling telephone's CO (the "calling CO"), it generates a signal that tells the calling CO that a person wants to make a call. The calling CO returns a dial tone to the calling telephone indicating that the calling CO is ready to accept a telephone number. The person dials a telephone number that is sent to the calling CO. The calling CO transmits the telephone number over a telephone network and connects with a called telephone's CO (the "called CO").

The called CO then attempts to complete the call by making a final connection to the called telephone. If the called telephone is on-hook when the called CO attempts to complete the call, the called CO send a ringing signal to the called telephone to indicate that a call is waiting. At the same time, ring-back tones are sent to the calling telephone, generally by the called CO or the calling CO. Once the called telephone is off-hook, the called telephone is connected with the called CO, which sends a signal through the telephone system indicating that it is connected with the called telephone. Thus, the ringing signal to the called telephone and the ring-back tones to the calling telephone are discontinued, and the calling telephone and the called telephone are connected.

A telecommunications device for the deaf (TDD) allows hearing-impaired persons to use telephones to communicate by typing messages. Generally, a TDD contains a keyboard, a modem, a display screen and/or a printer, and special acoustic cups into which a telephone handset is placed to connect the TDD to a CO via a telephone. To use a TDD, a person takes a telephone handset off-hook and places the handset into the acoustic cups. Once a calling TDD is connected to the calling CO via the telephone, the TDD user dials the telephone number of another TDD.

The called TDD "rings" by a light on the TDD blinking in conjunction with the ringing signal sent to the called TDD. When the handset for the called TDD's telephone is off-hook and placed in the called TDD's acoustic cups, the called TDD is connected with the called CO. The called CO transmits a signal through the telephone system indicating the connection with the called TDD, ring-back tones to the calling TDD are discontinued, and the called TDD and calling TDD are connected. Some TDDs connect directly to the telephone line in the same manner as a telephone, and thus do not contain acoustic cups. These TDDs contain the circuitry, usually contained in a telephone, that completes the connection to the CO and thus do not need to hold a telephone handset.

A TDD connected with a CO, whether via a telephone whose handset is placed on a TDD's acoustic cups, via circuitry internal to a TDD, or otherwise, is "off-hook." Conversely, a TDD that is not connected to a CO is "on-hook." In addition, with regard to both TDDs with acoustic cups and TDDs without acoustic cups, a TDD from which a call is made is a "calling TDD," and a TDD to which the call is made is a "called TDD."

Once the calling and called TDDs are connected with each other via their respective COs, the TDD users type messages using their TDD keyboards. The typed characters produced by the TDDs are Baudot characters that are converted into frequency shift keyed (FSK), then and transmitted over a telephone line. When the FSK tones reach the other TDD, they are converted back into Baudot characters to be displayed on the TDD's display screen, and/or printed on the TDD's printer. A TDD message can be transmitted and received only when the calling TDD and the called TDD are off-hook.

Caller ID (CID) is a service offered by telephone companies that provides to a called party information regarding a calling party, e.g., the telephone number of the calling telephone. CID information is sent to a CID reception device connected to the called telephone. CID information is available to TDD users by connecting a CID reception device to the TDD's telephone (for a TDD with acoustic cups) or the TDD (for a TDD without acoustic cups). Consequently, a TDD user incurs the cost of a CID reception device, in addition to the cost of a TDD, in. order to receive CID information. A TDD cannot receive information in the same format as a CID reception device. Furthermore, CID information is transmitted to a CID reception device while the called party's telephone is on-hook. By contrast, a TDD message is transmitted to a TDD while the TDD is off-hook.

BRIEF DESCRIPTION OF THE DRAWINGS

The invention is illustrated by way of example, and not by way of limitation, in the figures of-the accompanying drawings in which like reference numerals refer to similar elements.

DETAILED DESCRIPTION

A method of receiving caller identification (CID) information at a telecommunications device for the deaf (TDD) is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In order for a TDD to receive CID information in accordance with the invention, a called CO receives CID information regarding a calling party attempting to contact a TDD user. The called CO converts the CID information into a format that can be received by the called party's TDD, and attempts to establish a connection with the called TDD in order to transmit the CID information.

Once the called TDD is off-hook, thus establishing a connection between the called CO and the called TDD, the called CO transmits the CID information to the called TDD. However, the called CO postpones indicating to the telephone system that the called TDD is connected with the called CO, until the called CO determines whether the called party is willing to accept the call. Consequently, ring-back tones to the calling device (e.g., another TDD) continue, so that the calling party believes that there has been no answer at the called TDD even though the called TDD is off-hook.

After a sufficient period of time (e.g., enough time for the TDD user to review the CID information), the called CO determines that the called party is willing to accept the call. Therefore, the called CO indicates to the telephone system that the called CO is connected with the called TDD, ring-back tones to the calling device are discontinued, and the calling device is connected with the called TDD.

Figure 1:
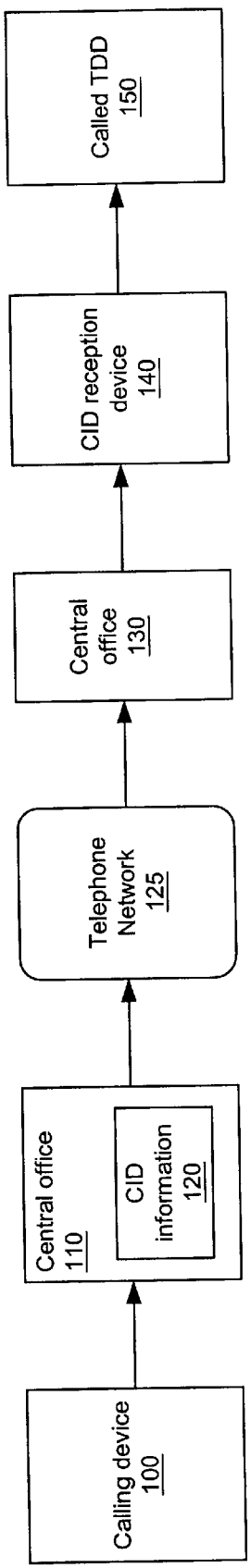
FIG. 1 is a prior art block diagram illustrating how CID information is transmitted to a CID reception device connected to a called TDD.

FIG. 1 is a block diagram illustrating how, in the prior art, CID information is transmitted to a CID reception device connected to a called TDD. A calling party using calling device 100 (e.g., a telephone coupled with a TDD), dials the telephone number of called TDD 150. CO 110 for calling device 100 forwards the calling party's CID information 120 through telephone network 125 to CO 130 for called TDD 150. Between the first and second ringing signals sent to called TDD 150, CO 130 transmits CID information 120 to called TDD 150. Finally, CID reception device 140 connected to called TDD 150 receives and displays CID information 120.

CID information consists of one or more of the following pieces of information: the digits of the calling party's telephone number, the time of the telephone call, the date of the telephone call, and the name of a person associated with the calling telephone number. In addition, the calling party can block some or all of the CID information (e.g., the caller's telephone number and a name associated with the telephone number) from being displayed. In that case, partial CID information (e.g., the time and date of the telephone call), along with an indication (e.g., "private") that some CID information has not been transmitted to the called party, is transmitted and displayed.

In the prior art, CID information is available to TDD users by connecting a CID reception device to either the TDD's telephone (for a TDD with acoustic cups) or the TDD (for a TDD without acoustic cups). CID information is transmitted by means of frequency shift keyed (FSK) modem tones that are converted into American Standard Code for Information Interchange (ASCII) characters by the CID reception device attached to the called telephone. A TDD cannot receive the same FSK modem tones that can be received by a CID reception device. Furthermore, CID information is transmitted to a CID reception device while the called party's telephone is on-hook. By contrast, a TDD message is transmitted to a TDD only while the TDD is off-hook, and once the TDD goes off-hook, the calling party realizes that the called TDD user answered the call.

Figure 2:
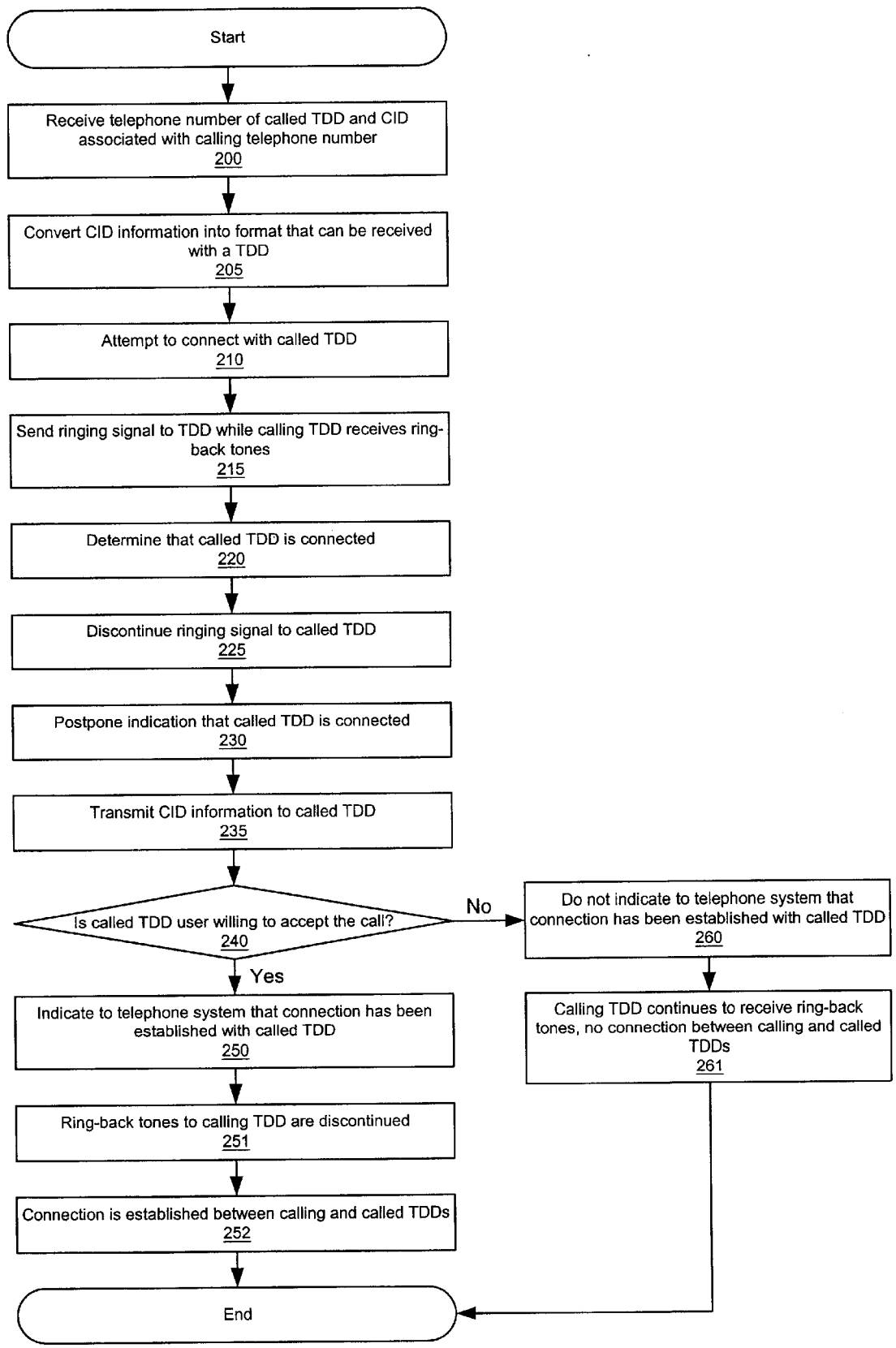
FIG. 2 is a flow chart of a method of one embodiment of receiving CID information with a TDD.

FIG. 2 is a flow chart of a method of one embodiment of receiving CID information with a called TDD in accordance with the invention, thus eliminating CID reception device 140 in FIG. 1. FIG. 2 is described in terms of establishing a connection between a calling TDD and a called TDD, then transmitting CID information to the called TDD. However, the invention is not limited to using one TDD to call another TDD. A device other than a TDD, e.g., a computer modem or a telephone, can be used to call a called TDD receiving CID information. In addition, a wireless device, e.g., a cellular telephone, can be used to call a TDD receiving CID information. A "calling party" can be a person or a device, e.g., a computer. Finally, any reference to a TDD includes both a TDD that has acoustic cups so that it can be used with a telephone, and a TDD that does not need to be used with a telephone.

At 200, a called CO receives the telephone number of a called TDD, and CID information regarding the telephone number from which the call is made using another TDD. The CID information is in a format (e.g., ASCII character format) that cannot be received with a TDD. In one embodiment, the CID information includes one or more of the date and time of the telephone call, the digits of the telephone number from which the call is made, and the name of a person associated with the telephone number from which the call is made. The CID information can also consist of an indication that the calling party has blocked transmission of some or all of the CID information.

At 205, the called CO converts the CID information into a format that can be received with a TDD. The called CO is not limited to converting the CID information into a format that can be received with a TDD immediately after receiving the CID information. The called CO can convert the CID information at any time, e.g., while the called TDD is ringing, or after the called TDD is connected with the called CO. In one embodiment, the called CO receives the CID information in ASCII character format, converts the CID information into Baudot character format, and then into FSK tones that can be received with a TDD. Baudot character format and FSK tones that can be received with a TDD are well-known to those of ordinary skill in the art, and thus will not be discussed further except as they pertain to the present invention.

At 210, the called CO attempts to connect with the called TDD, e.g., via a called telephone in the case of a TDD that has acoustic cups, or with the called TDD directly in the case of a TDD that does not need acoustic cups to connect with a CO. At 215, the called CO, while attempting to connect with the called TDD, sends a ringing signal to the called TDD, as the calling TDD receives ring-back tones from the calling CO, the called CO, or otherwise.

At 220, the called CO determines that the called TDD is off-hook and thus is connected with the called CO. Consequently, at 225 the called CO discontinues the ringing signal to the called TDD. At 230, however, the called CO postpones indicating to the telephone system that the called TDD has connected with the called CO, thus waiting to determine whether the called party is willing to accept the call. Consequently, the calling TDD continues to receive ring-back tones from the calling CO, the called CO or otherwise, and the calling party does not realize that the called TDD is off-hook.

At 235, the called CO transmits the CID information to the called TDD. At 240, after a sufficient period of time (e.g., enough time for the called TDD user to review the CID information), the called CO determines whether the called TDD user is willing to accept the call. If the called CO determines that the called TDD user is willing to accept the call, then at 250 the called CO indicates to the telephone system (e.g., by transmitting a signal through the telephone system) that a connection has been established between the called TDD and the called CO. In one embodiment, the called CO determines that the called TDD user is willing to accept the call by determining that the called TDD has remained off-hook for a period of time. The called CO also can determine that the called TDD user is willing to accept the call by determining that a button on the called TDD, or on a telephone connected with the called TDD, has been pressed.

As a result of the called CO indicating that a connection has been established between the called TDD and the called CO, at 251 ring-back tones to the calling TDD are discontinued. Therefore at 252, a connection is established between the calling TDD and the called TDD.

If at 240 the called CO determines that the called TDD user does not want to accept the call from the calling TDD user, then at 260, the called CO does not indicate to the telephone system that the called TDD has connected with the called CO. In that case, at 261, the calling TDD continues to receive ring-back tones, and no connection is established between the calling and called TDDs. In one embodiment, the called CO determines that the called TDD user does not want to accept the call by determining that the called TDD is on-hook after having been off-hook to receive the CID information. The called CO could also determine after a period of time that the called TDD user failed to push a button or a key on the keyboard of the called TDD, or on a telephone connected with the called TDD, which if pushed would have indicated that the called TDD user wanted to accept the call. In addition, the called CO could determine that the called TDD user pushed a button or a key on the keyboard of the called TDD, or on a telephone connected with the called TDD, which indicates that the called TDD user does not want to accept the call.

FIG. 2 describes the invention in terms of a method. However, one should also understand it to represent a machine-accessible medium having recorded, encoded or otherwise represented thereon instructions, routines, operations, control codes, or the like, that when executed by or otherwise utilized by the machine, cause the machine to perform the method as described above or other embodiments thereof that are within the scope of this disclosure.

Figure 3:
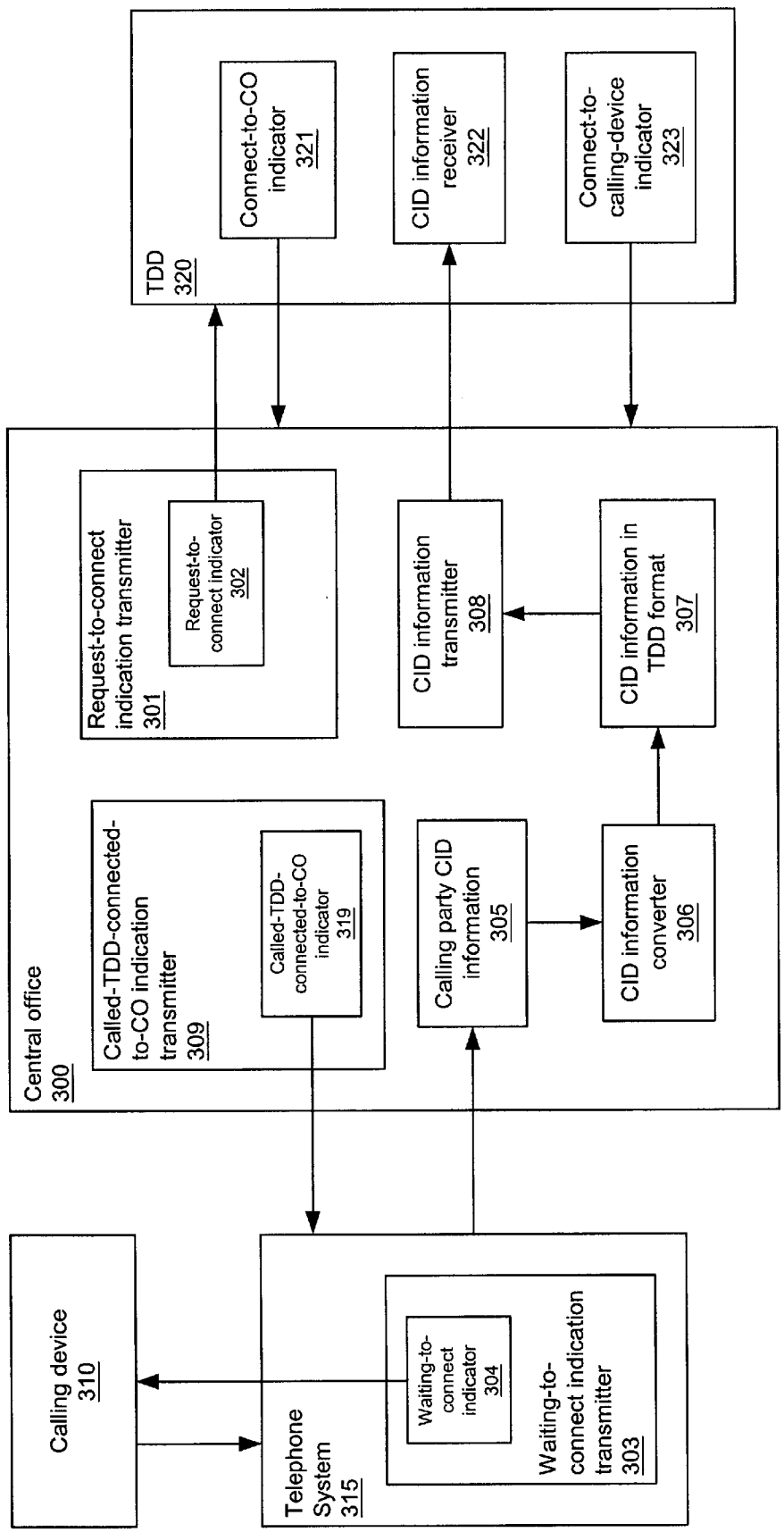
FIG. 3 is a block diagram of a CO transmitting CID information to a TDD.

FIG. 3 is a block diagram of a CO transmitting CID information to a TDD. CO 300 receives a request from calling device 310 via telephone system 315 to connect with TDD 320. Consequently, request-to-connect indication transmitter 301 transmits request-to-connect indicator 302 to TDD 320 (e.g., TDD 320 receives a ringing signal). In addition, waiting-to-connect indication transmitter 303 transmits waiting-to-connect indicator 304 to calling device 310 (e.g., calling device 310 receives ring-back tones) via telephone system 315.

CO 300 receives calling party CID information 305 from calling device 310's CO (not shown) via telephone system 315 in a format that cannot be received with TDD 320. Thus, CO 300 uses CID information converter 306 to convert calling party CID information 305 into CID information in TDD format 307.

CO 300 then determines based on connect-to-CO indicator 321 from TDD 320 (e.g., TDD 320 is off-hook) that TDD 320 is connected with CO 300. Consequently, request-to-connect indication transmitter 301 discontinues transmitting request-to-connect indicator 302 to TDD 320. However, CO 300 does not transmit to telephone system 315 called-TDD-connected-to-CO indicator 319. Consequently, calling device 310 continues receiving waiting-to-connect-indicator 304 via telephone system 315.

CID information transmitter 308 then transmits CID information in TDD format 307 to CID information receiver 322 of TDD 320. The user of TDD 320 reviews CID information in TDD format 307 received by CID information receiver 322. If the user of TDD 320 decides to accept the call, CO 300 determines based on connect-to-calling device indicator 323 from TDD 320 (e.g., telephone 320 remains off-hook for a period of time) that the user of TDD 330 is willing to accept the call. Thus, called-TDD-connected-to-called-CO indication transmitter 309 transmits called-TDD-connected-to-CO indicator 319 to telephone system 315, waiting-to-connect indication transmitter 303 discontinues sending waiting-to-connect indicator 304 to calling device 310, and calling device 310 is connected with TDD 320 through telephone system 315 and CO 300.

For purposes of illustration and ease of explanation, FIGS. 2 and 3 describe the method and apparatus, respectively, in connection with a TDD receiving CID information. However, the method and apparatus are not restricted to use with a TDD as the communication device for a hearing-impaired person receiving CID information, and the information received by the communication device for a hearing-impaired person is not limited to CID information.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method, comprising:

determining that a connection has been established with a destination device;

postponing an indication that the connection has been established with the destination device until determining whether the destination device is willing to establish a connection with an origination device attempting to establish a connection between the origination device and the destination device;

causing, as a result of postponing the indication that the connection has been established with the destination device, the origination device to continue receiving an indication that the connection between the origination device and the destination device has yet to be established; and transmitting to the destination device, as a result of determining that the connection has been established with the destination device, information regarding the origination device in a format compatible with a device enabling communication with a hearing-impaired person.

2. The method of claim 1, further comprising converting the information regarding the origination device into the format compatible with the device enabling communication with the hearing-impaired person.

3. The method of claim 2, wherein the destination device comprises the device enabling communication with the hearing-impaired person.

4. The method of claim 3, wherein determining that the connection has been established with the destination device comprises determining that the destination device is off-hook.

5. The method of claim 4, wherein the indication that the connection between the origination device and the destination device has yet to be established comprises ring-back tones.

6. The method of claim 5, wherein the information regarding the origination device comprises one or more of a date of the telephone call, a time of the telephone call, digits of a telephone number, and a name of a person associated with the telephone number.

7. The method of claim 6, wherein the device enabling communication with the hearing-impaired person comprises a telecommunications device for the deaf (TDD).

8. The method of claim 7, further comprising:
   determining that the destination device is willing to establish the connection with the origination device;
   transmitting the indication that the connection has been established with the destination device, as a result of determining that the destination device is willing to establish the connection with the origination device; and
   establishing the connection between the origination device and the destination device.

9. The method of claim 8, wherein determining that the destination device is willing to establish the connection with the origination device comprises determining that the destination device continues to be off-hook for a period of time.

10. The method of claim 8, wherein determining that the destination device is willing to establish the connection with the origination device comprises determining that a button has been pressed on one or both of a destination TDD or a telephone coupled with the destination TDD.

11. The method of claim 7, further comprising:
    determining that the destination device is unwilling to establish a connection with the origination device; and
    failing to transmit the indication that the connection has been established with the destination device, as a result of determining that the destination device is unwilling to establish a connection with the origination device.

12. The method of claim 11, wherein determining that the destination device is unwilling to establish the connection with the origination device comprises determining that the destination device is on-hook after having been off-hook.

13. The method of claim 11, wherein determining that the destination device is unwilling to establish the connection with the origination device comprises determining that a period of time has elapsed.

14. A method, comprising:
    receiving a telephone number of a called telecommunications device for the deaf (TDD);
    receiving caller identification (CID) information regarding a calling device used to make a telephone call to the called TDD;
    converting the CID information regarding the calling device into a format compatible with the called TDD;
    attempting to establish a connection with the called TDD;
    sending a ringing signal to the called TDD;
    receiving by the calling device ring-back tones;
    determining that the called TDD is off-hook;
    discontinuing the ringing signal to the called TDD as a result of determining that the called telephone is off-hook;
    postponing an indication to a telephone system that the called TDD is off-hook;
    continuing by the calling device to receive ring-back tones although the called TDD is off-hook; and
    transmitting the information regarding the calling device to the called TDD.

15. The method claim 14, wherein the calling device comprises a calling TDD.

16. The method of claim 15, wherein the CID information regarding the calling device comprises one or more of digits of the telephone number, a date of the telephone call a time of the telephone call, and a name of a person associated with the calling device.

17. The method of claim 16, further comprising:
    determining that the called TDD has continued to be off-hook for a period of time;
    determining, based on determining that the called TDD has continued to be off-hook for a period of time, that the called TDD is willing to connect with the calling device;
    transmitting to the telephone system the indication that the called TDD is willing to connect with the calling device;
    discontinuing to receive by the calling device the ring-back tones as a result of the indication that the called TDD is willing to connect with the calling device; and
    connecting with the calling device the called TDD.

18. The method of claim 16, further comprising:
    determining that the called TDD is on-hook after being off-hook;
    determining, based on determining that the called TDD is on-hook, that the called TDD is unwilling to connect with the calling device; and
    failing to transmit to the telephone system the indication that the called TDD is willing to connect with the calling device.

19. An article of manufacture comprising:
    a machine-accessible medium including thereon sequences of instructions that, when executed, cause an electronic system to:
    determine that a connection has been established with a destination device;
    postpone an indication that the connection has been established with the destination device until determining whether the destination device is willing to establish a connection with an origination device attempting to establish a connection between the origination device and the destination device;
    cause, as a result of postponing the indication that the connection has been established with the destination device, the origination device to continue receiving an indication that the connection between the origination device and the destination device has yet to be established; and
    transmit to the destination device, as a result of determining that the connection has been established with the destination device, information regarding the origination device in a format compatible with a device enabling communication with a hearing-impaired person.

20. The article of manufacture of claim 19, wherein the machine-accessible medium further comprises sequences of instructions that, when executed, cause the machine to convert the information regarding the origination device into the format for the device enabling communication with the hearing-impaired person.

21. The article of manufacture of claim 20, wherein the sequences of instructions that, when executed, cause the machine to indicate to the origination device attempting to establish a connection with the destination device that a connection between the origination device and the destination device has yet to be established comprise sequences of instructions that, when executed, cause the machine to indicate to a first telephone coupled with a first device enabling communication with a hearing-impaired person attempting to establish a connection with a second telephone coupled with a second device enabling communication with a hearing-impaired person that a connection between the first telephone coupled with the first device enabling communication with the hearing-impaired person and the second telephone coupled with the second device enabling communication with the hearing-impaired person has yet to be established.

22. The article of manufacture of claim 21, wherein the sequences of instructions that, when executed, cause the machine to transmit to the destination device information regarding the origination device in the format for the device enabling communication with the hearing-impaired person comprise sequences of instructions that, when executed, cause a machine to transmit to the destination device one or more of a date of the telephone call, a time of the telephone call, digits of a telephone number, and a name of a person associated with the telephone number.

23. The article of manufacture of claim 22, wherein the sequences of instructions that, when executed, cause the machine to transmit to the destination device information regarding the origination device in the format for the device enabling communication with the hearing-impaired person comprise sequences of instructions that, when executed, cause the machine to transmit to the destination device information regarding the origination device in a format for a telecommunications device for the deaf (TDD).

24. An apparatus, comprising:

a request-to-connect indication transmitter to transmit to a destination device an indication that an origination device is requesting a connection with the destination device, until the destination device provides an indication to connect;

a waiting-to-connect indication transmitter to transmit to the origination device an indication that a connection has yet to be established between the origination device and the destination device, until the destination device provides an indication to connect with the origination device;

a willing-to-connect-with-origination-device indication transmitter to transmit to a telephone system an indication that the destination device is willing to connect with the origination device; and an origination-device information transmitter to transmit to the destination device, once the destination device provides an indication to connect, information regarding the origination device in a format for a communication device for a hearing-impaired person.

25. The apparatus of claim 24, further comprising an origination-device information converter to convert the information regarding the origination device into the format for the communication device for the hearing-impaired person.

26. The apparatus of claim 25, wherein the origination device and the destination device comprise telephones connected with communication devices for hearing-impaired persons.

27. The apparatus of claim 26, wherein the indication to connect comprises an off-hook indication.

28. The apparatus of claim 27, wherein the indication to connect with the origination device comprises the off-hook indication continuing for a period of time.

29. The apparatus of claim 28, wherein the information regarding the origination device comprises one or more of digits of a telephone number, a date of a telephone call, a time of the telephone call, and a name of a person associated with the origination device.

* * * * *